United States Patent [19]

Matsumoto et al.

[11] 4,201,441
[45] May 6, 1980

[54] HOLOGRAM AND METHOD OF PRODUCTION THEREOF

[75] Inventors: Masakazu Matsumoto, Yokohama; Koujiro Yokono, Kawasaki; Takashi Tanaka, Tokyo; Shigeo Toganou, Tokyo; Hiroyoshi Kishi, Tokyo; Katsuhiko Nishide, Yokohama, all of Japan

[73] Assignee: Canon Kabushiki Kaisha, Tokyo, Japan

[21] Appl. No.: 4,607

[22] Filed: Jan. 18, 1979

[30] Foreign Application Priority Data

Jan. 26, 1978 [JP] Japan ..................... 53-8041
Jan. 27, 1978 [JP] Japan ..................... 53-8137

[51] Int. Cl.$^2$ .................... G03H 1/00; G02B 1/04
[52] U.S. Cl. ........................ 350/3.61; 430/2; 430/9; 430/945
[58] Field of Search ................... 350/3.61; 96/27 H

[56] References Cited

U.S. PATENT DOCUMENTS

3,617,274 11/1971 Lin ........................ 96/27 H
3,672,744 6/1972 Strope et al. ............... 96/27 H X

FOREIGN PATENT DOCUMENTS

1430242 3/1976 United Kingdom ............. 430/2

*Primary Examiner*—James R. Hoffman
*Attorney, Agent, or Firm*—Fitzpatrick, Cella, Harper & Scinto

[57] ABSTRACT

Holograms are produced by exposing a film-like sensitive member composed of polyvinylcarbazole or its derivatives containing an iodine compound to an interference pattern of laser, swelling the sensitive member thus exposed in a first solvent and simultaneously eluting most of the iodine compound, if desired, the iodine compound may be eluted before this swelling treatment, and then shrinking the swollen sensitive member in a second solvent.

20 Claims, 1 Drawing Figure

HOLOGRAM AND METHOD OF PRODUCTION THEREOF

BACKGROUND OF THE INVENTION

1. Field of the Invention

This invention relates to a hologram, more particularly, a volume phase hologram, and a process for producing the hologram.

2. Description of the Prior Art

Holography is a technique that a coherent wave such as laser is projected to a body and the amplitude and phase are modulated depending on the shape of the body, the coherent wave reflected or passing through is recorded (this is hologram), and the hologram is irradiated again with laser to form an optical image of the original body.

Heretofore, there have been studied and developed various hologramic recording materials.

For example, there are now provided bleach-out silver salts (U.S. Pat. No. 3,672,744), photoresist, thermoplastics, gelatine dichromate (U.S. Pat. No. 3,617,274), inorganic glass materials, and ferroelectric substances.

Hologramic recording materials should have, in general, the following characteristics:

(1) High sensitivity to laser, in particular, in a visible wavelength region;
(2) High resolution;
(3) High diffraction efficiency of the resulting hologram;
(4) Less noise of the resulting hologram;
(5) The resulting hologram is stable; and
(6) Easy recording and regeneration.

None of prior art materials have all the above mentioned characteristics. Only a few prior art materials have some of those characteristics.

Among prior art materials, bleach-out silver salts and dichromated gelatine are practically used, but the former requires a bleach-out treatment in addition to usual treatments and the resulting holograms are of poor lightfastness, and the latter gives a hologram of poor humidity resistance and poor shelf stability.

SUMMARY OF THE INVENTION

An object of the present invention is to provide holograms free from the above mentioned drawbacks.

Another object of the present invention is to provide a process for producing holograms of high shelf stability, high humidity resistance, high resolution and high diffraction efficiency (volume phase) by using hologramic recording materials having a laser sensitivity in a visible wavelength region and a high sensitivity.

A further object of the present invention is to provide a hologram of high shelf stability, high humidity resistance, high resolution and high diffraction efficiency (volume phase).

According to one aspect of the present invention, there is provided a process for producing holograms which comprises:

(i) exposing to an interference pattern of laser a film-like sensitive member for recording holograms which is mainly composed of a polymer selected from the group consisting of polyvinylcarbazole, alkyl-substituted derivatives thereof and halogen-substituted derivatives thereof and is sensitized to a radiation by using an iodine compound, (ii) swelling the sensitive member in a first solvent until a volume of the sensitive member becomes 120% or more based on the volume immediately after the exposure and simultaneously eluting most of the iodine compound, and (iii) transferring the sensitive member into a second solvent to treat the sensitive member until the volume of the sensitive member becomes 110% or less based on the volume immediately after the exposure.

According to another aspect of the present invention is to provide a hologram produced by the above mentioned process.

According to a further aspect of the present invention is to provide a process for producing holograms which comprises:

(i) Exposing to an interference pattern of laser a film-like sensitive member for recording holograms which is mainly composed of a polymer selected from the group consisting of polyvinylcarbazole, alkyl-substituted derivatives thereof and halogen-substituted derivatives thereof and is sensitized to a radiation by using an iodine compound, (ii) soaking the sensitive member in a first solvent to elute and remove most of the iodine compound without eluting the polymer, (iii) then swelling the sensitive member in a second solvent until a volume of the sensitive member becomes 120% or more based on the volume immediately after the exposure, and (iv) transferring the sensitive member into a third solvent to treat the sensitive member until the volume of the sensitive member becomes 110% or less based on the volume immediately after the exposure.

According to still another aspect of the present invention, there is provided a hologram produced by the above mentioned process.

BRIEF DESCRIPTION OF THE DRAWING

In the drawing, the single FIGURE shows diagrammatically an example of optical systems used for producing holograms according to the present invention.

DESCRIPTION OF THE PREFERRED EMBODIMENTS

Figure 1:
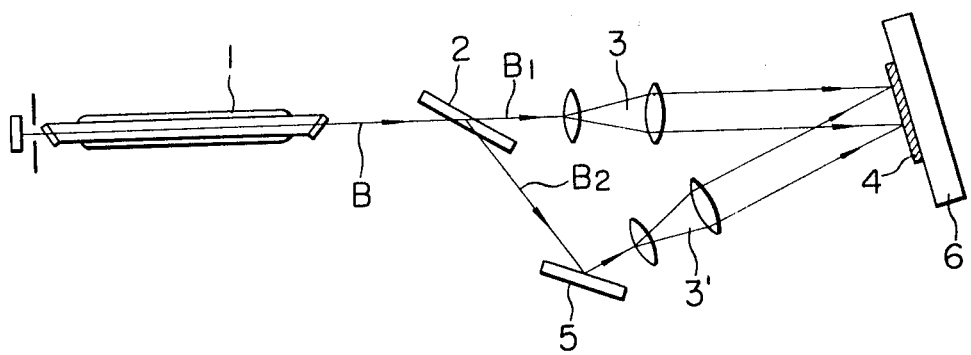

The film-like sensitive member for recording holograms (hereinafter referred to as "sensitive member") is mainly composed of a polymer selected from the group consisting of polyvinylcarbazole, alkyl-substituted derivatives thereof and halogen-substituted derivatives thereof.

For example, there may be mentioned polyvinylcarbazole, poly-3-chlorovinylcarbazole, poly-3-bromovinylcarbazole, poly-3-iodovinylcarbazole, poly-3-methylvinylcarbazole, poly-3-ethylvinylcarbazole, chlorinated polyvinylcarbazole, and brominated polyvinylcarbazole.

Among them, the unsubstituted polyvinylcarbazole is practically one of the best polymers because it is easily available and the resulting hologram has excellent characteristics.

The polymer used as a main component of the sensitive member should be sensitized to a radiation by using an iodine compound.

The iodine compound is incorporated in the polymer component and constitutes the sensitive member having a sufficient sensitivity in a visible wavelength region.

Representative iodine compounds are carbon tetraiodide, iodoform, ethylene tetraiodide, ethane triiodide, ethane tetraiodide, ethane pentaiodide, and ethane hexaiodide.

Since color of these compounds ranges from yellow to orange, it is possible to broaden the spectral sensitivity region up to a visible wavelength region and the sensitive member is of a very high sensitivity which may be attributable to the iodine atom which is apt to dissociate to produce a radical.

The sensitive member of the present invention may be produced by dissolving the above mentioned polymer and the iodine compound at an appropriate ratio in a solvent or dispersing them in a solvent and then coating the resulting solution or dispersion on an optional substrate such as glass, transparent resin film and the like, or making a film directly from the solution or dispersion.

The amount of the iodine compound is usually 0.1–200% by weight, preferably 2–50% by weight based on the polymer.

When the polymer used is of a poor film shapeability, a plasticizer such as terphenyl, epoxy resin and the like may be added thereto. When the sensitive member used is less stable, there may be added a known antioxidant such as substituted phenols and the like.

The sensitive member thus produced is sensitive to laser having emission lines at 4416 Å, 4579 Å, 4762 Å, 4765 Å, 4880 Å, 5145 Å, 5208 Å, 5308 Å, and the like in a visible wavelength region. In particular, a sensitive member containing carbon tetraiodide has a spectral sensitivity region up to 5600 Å.

The sensitivity is so excellent that, for example, an energy of 10 mJ/cm$^2$ can give a practically satisfactory diffraction efficiency for an emission line of an argon laser of 4880 Å.

A sensitive member prepared according to the above mentioned procedure is exposed to an interference pattern formed by two coherent laser fluxes, i.e. a light modulated by object and a reference beam of light.

In this procedure, there are caused crosslinking reactions between the polymers in the sensitive member depending upon the intensity of the interference patter. As the result, there is formed in the sensitive member a pattern based on the degree of the crosslinking thus caused.

The above mentioned procedures may be carried out in an optical system illustrated in the attached FIGURE.

Coherent beam B emitted from radiation source 1 such as a laser is divided into two ways by beam splitter 2 and the resulting beams $B_1$ and $B_2$ are enlarged and made parallel by optical lens systems 3 and $3^1$, respectively, and sensitive member 4 is exposed to an interference pattern formed by the parallel lights. Reference numerals 5 and 6 show a reflection mirror and a light absorbing plate having an antireflection coating on the surface, respectively.

Following the above steps, the solvent treatments as one feature of the present invention are applied to the sensitive member to produce finally a desired hologram.

According to the first aspect of the present invention, the sensitive member exposed to the interference pattern may be soaked in a solvent which hardly elutes the polymer, but can swell the polymer, or may be placed in an atmosphere of the solvent vapor so as to swell the sensitive member until the volume of the sensitive member becomes 120% or more based on the original volume. This degree of swelling affects characteristics of the resulting hologram so that the sensitive member should be swelled up to at least 120% based on the volume immediately after the exposure, but if a hologram of a high diffraction efficiency is desired, it is recommendable to swell up to at least 140%. Simultaneously with this swelling, most or almost all of the unnecessary iodine compound is eluted from the sensitive member and removed and therefore, any other procedure for removing the iodine compound, i.e. a fixing step, is not necessary.

The solvents used in the above procedure should be those which hardly elute the polymer and hardly elute the resulting crosslinked polymers during a short time. As the solvent, there may be mentioned benzene, benzene derivatives such as toluene, xylene, ethylbenzene, propylbenzene, cumene, phenol, cresol, chlorobenzene, dichlorobenzene, nitrobenzene, benzyl alcohol, benzyl chloride, benzyl bromide, and the like, naphthalene derivatives such as α-methylnaphthalene, α-chloronaphthalene, and the like, halogen-substituted aliphatic hydrocarbons such as dichloromethane, chloroform, trichloroethylene, dichloroethane, bromoform, trichloroethane, tetrachloroethane, and the like, ketones such as acetone, methyl ethyl ketone, cyclohexanone and the like, cyclic ethers such as dioxane, tetrahydrofuran, and the like, esters such as ethyl acetate, ethyl formate and the like, amines, and amides.

Some of these solvents elute the polymer or does not swell the polymer at room temperature, but by changing the treatment temperature they may be used.

Among the above enumerated solvents, xylene or a mixture of xylene and other solvent is preferable.

As mentioned above, after swelling and elution of the iodine compound, the sensitive member is subjected to a shrinking treatment in another solvent. This shrinking treatment causes a rapid shrinking of the swollen sensitive member and the treatment is continued until the volume of the sensitive member becomes 110% or less based on the volume of the sensitive member immediately after the exposure (in other words, the volume before swelling).

When shrunk to that extent, a hologram of a high diffraction efficiency can be obtained. It is recommendable to bring the once increased volume to the volume before the increase as far as possible.

As a liquid used for shrinking, there can be used any solvent incapable of swelling or dissolving the sensitive member and miscible with the above mentioned solvent for swelling. Representative liquids for shrinking are alkanes or cycloalkanes such as pentane, hexane, heptane, octane, isooctane, cyclohexane and the like, alcohols such as methyl alcohol, ethyl alcohol, n-propyl alcohol, isopropyl alcohol, butyl alcohol, amyl alcohol and the like, ethers such as diethyl ether, methyl ethyl ether, diisopropyl ether and the like.

Among them, saturated hydrocarbons of $C_5$-$C_7$ have an excellent shrinking effect and are most suitable for the present invention.

According to a series of procedures as mentioned above, a volume phase hologram is formed. The resulting hologram is colorless and highly transparent, has a diffraction efficiency as high as maximum 98%, a resolution as high as 3500 lines/mm. or more, an excellent shelf-stability and in particular, an excellent humidity resistance, and is not adversely affected by light because the photosensitive component has been removed.

Alternatively, according to the second aspect of the invention, the solvent treating procedure as mentioned above may be modified as follows.

Following the exposure step, the sensitive member thus exposed to patterns may be soaked in a solvent which hardly elutes the crosslinked polymer products formed by the light reaction as well as the polymer in the sensitive member and thereby substantially all of the iodine compound is eluted and removed from the sensitive member. By this procedure, photosensitive elements do not remain in the resulting hologram. Therefore, the hologram is hardly deteriorated during storage. Further it has been found that the above mentioned treatment can effectively prevent formation of shape defects such as crack and the like. In this procedure, the following solvents may be used by controlling the treating temperature in such a way that the crosslinked polymer product formed by the light reaction and the polymer are hardly dissolved out.

As the solvent, there may be mentioned benzene, benzene and naphthalene derivatives such as toluene, xylene, ethylbenzene, n-propylbenzene, cumene, phenol, cresol, chlorobenzene, dichlorobenzene, nitrobenzene, benzyl alcohol, benzyl chloride, benzyl bromide, α-methyl-naphthalene, α-chloronaphthalene and the like, halogen-substituted aliphatic hydrocarbons such as dichloromethane, chloroform, trichloroethylene, dichloroethane, trichloroethane, tetrachloroethane, bromoform and the like, ketones such as acetone, methyl ethyl ketone, cyclohexanone and the like, esters such as ethyl acetate, ethyl formate and the like, cyclic ethers such as dioxane, tetrahydrofuran, and the like, esters such as ethyl acetate, ethyl formate, and the like, amines, and amides.

In the second aspect of the invention, further two steps of solvent treatment are necessary to obtain the desired hologram. That is, the sensitive member from which the iodine compound has been substantially removed may be soaked in a solvent which hardly elutes the polymer, but can swell the polymer, or may be placed in an atmosphere of the solvent vapor so as to swell the sensitive member until the volume of the sensitive member becomes 120% or more based on the volume immediately after the exposure.

This degree of swelling affects characteristics of the resulting hologram so that the sensitive member should be swelled up to at least 120% based on the volume of the sensitive member immediately after exposure, but if a hologram of a high diffraction efficiency is desired, it is recommendable to swell up to at least 140%.

In this step, simultaneously with this swelling, the iodine compound is further and almost completely removed, and therefore, the hologram finally produced after the next treating step does not contain any more photosensitive elements.

Solvents used in this step are those which hardly elute the polymer and the crosslinked polymers during a short time. Representative ones are almost the same as the solvents used for swelling the polymer and eluting the iodine compound in the above mentioned first aspect of the invention.

Some of these solvents elute the polymer or does not swell the polymer at room temperature, but by changing the treatment temperature they may be used.

Among the above mentioned solvents, xylene or a mixture of xylene and other solvent is preferable.

As mentioned above, after swelling and elution of the iodine compound, the sensitive member is subjected to a shrinking treatment in another solvent. This shrinking treatment causes a rapid shrinking of the swollen sensitive member and the treatment is continued until the volume of the sensitive member becomes 110% or less based on the volume of the sensitive member immediately after the exposure (in other words, the volume before swelling).

When shrunk to that extent, a hologram of a high diffraction efficiency can be obtained. It is recommendable to bring the once increased volume to the volume before the increase as far as possible.

The solvents may be the same as those used in the above mentioned first aspect of the invention for shrinking.

Among them, saturated hydrocarbons of $C_5$-$C_7$ have an excellent shrinking effect and are most suitable for the present invention.

According to a series of procedures as mentioned above, a volume phase hologram is formed. The resulting hologram is colorless and highly transparent, has a diffraction efficiency as high as maximum 98%, a resolution as high as 3500 lines/mm. or more, an excellent shelf-stability and in particular, an excellent humidity resistance, and is not adversely affected by light because the photosensitive component has been removed.

As is clear from above, holograms of the present invention are far better than conventional holograms in various characteristics.

The following examples are given for illustrating the present invention, but should not be construed limiting the present invention.

EXAMPLE 1

2.0 g. of polyvinylcarbazole and 0.1 g. of carbon tetraiodide were dissolved in 25 g. of monochlorobenzene and coated on a glass plate of 1.0 mm. thick having a polished surface by spinner coating in the dark, and dried in air in the dark to obtain a sensitive member of 5.0 microns thick. The resulting sensitive member was measured with respect to spectral sensitivity region by using Grating Spectrograph, RM-23-1 (supplied by NALUM Co. Ltd.) and it was found that this sensitive member has sensitivity in a visible wavelength region up to 5600Å at the longer wavelength side. This sensitive member was exposed to an emission line of 5146 Å of an argon laser at an offset angle of 70° and a light intensity ratio, 1:1 by using an optical system illustrated in the single FIGURE. The light intensity was a sum of both beams and was 3 mw/cm$^2$ before incidence. The sensitive member thus exposed to the pattern was soaked in a mixed solvent composed of xylene and toluene (1:1) at 30° C. and allowed to stand until the volume of the sensitive member becomes 135% based on the original volume (i.e. the volume immediately after the exposure). It took about 1.5 minutes. At that time, almost all of the carbon tetraiodide was eluted into the solvent from the sensitive member, and the sensitive member became colorless. Then, when the sensitive member was taken out of the solvent and soaked in n-hexane at 25° C. and allowed to stand for about 2 minutes. Then the sensitive member was taken out of the n-hexane and it was found that the volume of the sensitive member was 100% based on the original volume. In this way, a volume phase hologram was obtained which had a spatial frequency of about 3000 lines/mm. at a wavelength of 5146 Å, and the diffraction efficiency was maximum at an exposure energy of 40 mJ/cm$^2$ and the value was 98% at the same read-out wavelength as the exposure. The transmittance was 89%. When the hologram plate was allowed to stand at 70° C. and 100% RH for the purpose of investigating the humidity and heat resistance, there was found no change in the hologramic characteristics even after one month.

Further, light resistance was investigated by irradiating the hologram plate at a distance of 20 cm. with a 500 W mercury lamp for 5 hours and it was found that the hologram plate became somewhat yellowish and the hologramic characteristics were little changed.

EXAMPLES 2–5

The sensitive member as used in Example 1 was exposed to an interference pattern in a way similar to Example 1 and then treated with the following solvents in Step 1 and Step 2 for 2 minutes each.

| Example No. | Step 1 | Step 2 |
|---|---|---|
| 2 | 30° C., xylene | 30° C., n-pentane |
| 3 | 25° C., cumene | 20° C., n-hexane |
| 4 | 25° C. xylene/carbon tetrachloride (7/3) 30° C. | 20° C., n-pentane |
| 5 | xylene/ethyl acetate (5/2) | 20° C., n-heptane |

After the soaking steps, a volume and a diffraction efficiency of the sensitive member were as shown in the following table where the volume is percentage based on a volume of the sensitive member immediately after exposed to a pattern and the diffraction efficiency is measured in a way similar to Example 1.

| Example No. | Volume after the first step (%) | Volume after the second step (%) | Diffraction efficiency (%) |
|---|---|---|---|
| 2 | 140 | 105 | 95 |
| 3 | 125 | 105 | 79 |
| 4 | 130 | 110 | 83 |
| 5 | 145 | 100 | 98 |

EXAMPLES 6–9

Each hologram plate obtained in Examples 2–5 was allowed to stand at 70° C. and 100% RH for one month, but any change in the hologramic characteristics was not observed at all.

Light resistance was measured by irradiating the hologram plates obtained in Examples 2–5 at a distance of 20 cm. for 5 hours with a 500 W mercury lamp. The hologram plates became slightly yellow, but the hologrami characteristics were hardly changed.

EXAMPLE 10

2.0 g. of a 3-methylvinylcarbazole polymer and 0.4 g. of iodoform were dissolved in 25 g. of cyclohexanone and treated in a way similar to Example 1 to produce a hologramic recording sensitive member of 4.5 microns thick, measured in a way similar to Example 1, a spectral sensitivity range of the sensitive member was found to be 4800 Å (the upper limit). This sensitive member was exposed to an emission line of 4579 Å of an argon laser in a way similar to Example 1, soaked in trichloroethylene at 20° C. and allowed to stand until the volume became 180% based on the volume immediately after exposure. This tools about 3.5 minutes. Almost all of the iodoform was eluted into trichloroethylene from the sensitive member and the sensitive member became colorless. The sensitive member was taken out of trichloroethylene, then soaked in isopropyl alcohol at 30° C. for about 2 minutes and taken out of the isopropyl alcohol. A volume of the resulting sensitive member was 105% based on the volume immediately after exposure.

This volume phase hologram had a spatial frequency of about 3600 lines/mm., a diffraction efficiency of 82% and a transmittance of 89% (Exposure energy of 150 mJ/cm$^2$). Stability of the hologram was examined in a way similar to Example 1 and found to be almost as good as that of Example 1.

EXAMPLE 11

3.0 g. of chlorinated polyvinylcarbazole and 0.2 g. of ethylene tetraiodide were dissolved in 30 g. of tetrahydrofuran and then subjected to the same procedures as in Example 10. The resulting hologram had good characteristics similar to those in Example 10.

EXAMPLES 12–14

2.5 g. of a 3-bromovinylcarbazole polymer and 0.1 g. of carbon tetraiodide were dissolved in 25 g. of tetrahydrofuran and treated in a way similar to Example 1 to produce three hologramic recording sensitive members of 3.0, 6.0 and 8.5 microns thick, respectively. These three sensitive members were exposed to an interference pattern in a way similar to Example 1, soaked in a mixed solvent of xylene and trichloroethylene (3:1, by volume) at 30° C. and allowed to stand until the volume because the value as shown in column of "Volume at the first time" of the following table. Then the sensitive members were taken out of the solvent, soaked in n-hexane at 25° C. until the volume became the value as shown in column of "Volume of the second time" of the following table and then taken out of the n-hexane to complete a hologram.

| Example No. | Thickness of sensitive member (microns) | Volume of the first time (%) | Volume of the second time (%) |
|---|---|---|---|
| 12 | 3.0 | 125 | 110 |
| 13 | 6.0 | 170 | 100 |
| 14 | 8.5 | 155 | 105 |

The percentages in the above table are those based on the volume of the sensitive member immediately after exposure to an interference pattern.

Diffraction efficiency and transmittance (measured in a way similar to Example 1) of each of the holograms are shown in the following table.

| Example No. | Diffraction efficiency (%) | Transmittance (%) |
|---|---|---|
| 12 | 49 | 85 |
| 13 | 95 | 88 |
| 14 | 90 | 82 |

Measured following the method of Example 1, humidity resistance and heat resistance of the holograms were as good as those of Example 1.

EXAMPLE 15

2.5 g. of 3-chlorovinylcarbazole polymer and 0.2 g. of carbon tetraiodide were dissolved in 30 g. of monochlorobenzene and coated on a glass plate of 1.0 mm. thick having a polished surface by spinner coating in the dark, and dried in air in the dark to obtain a sensitive member of 5.0 microns thick. The resulting sensitive member was measured with respect to spectral sensitivity region by using Grating Spectrograph, RM-23-1 (supplied by NALUM Co. Ltd.) and it was found that this sensitive member has sensitivity in a visible wavelength region up to 5600 Å at the longer wavelength side. This sensitive member was exposed to an emission line of 5146 Å of an argon laser at an offset angle of 70° and a light intensity ratio, 1:1 by using an optical system illustrated in the single FIGURE. The light intensity was a sum of both beams and was 3 mw/cm² before incidence. The sensitive member thus exposed to the pattern was soaked in acetone for about 2 minutes and then taken out of the acetone, and it was observed that almost all of the carbon tetraiodide was eluted into acetone from the sensitive member and the sensitive member became colorless. Then, the sensitive member was soaked in a mixed solvent composed of xylene and toluene (1:1) at 30° C. and allowed to stand until the volume of the sensitive member becomes 155% based on the original volume. It took about 3 minutes. After taken out of the mixed solvent, the sensitive member was soaked in n-pentane at 25° C. and allowed to stand for about 3 minutes. Then the sensitive member was taken out of the n-pentane and it was found that the volume of the sensitive member was 105% based on the original volume. In this way, a volume phase hologram was obtained which had a spatial frequency of about 3000 lines/mm. at a wavelength of 5146 Å, and the diffraction efficiency was maximum at an exposure energy of 40 mJ/cm² and the value was 88% at the same read-out wavelength as the exposure. The transmittance was 90%, when the hologram plate was allowed to stand at 70° C. and 100% RH for the purpose of investigating the humidity and heat resistance, there was found no change in the hologramic characteristics even after one month.

Further, light resistance was investigated by irradiating the hologram plate at a distance of 20 cm. with a 500 W mercury lamp for 5 hours and it was found that the hologram plate remained colorless and the hologramic characteristics were not changed at all.

EXAMPLE 16

2.0 g. of a 3-methylvinylcarbazole polymer and 0.4 g. of iodoform were dissolved in 25 g. of cyclohexanone and treated in the same way as in Example 1 to produce a hologramic recording sensitive member of 4.5 microns thick.

The spectral sensitivity region measured in a way similar to Example 1 was 4800 Å (the upper limit). This sensitive member was exposed to an emission line of 4579 Å of an argon laser in a way similar to Example 1.

The resulting sensitive member was soaked in ethyl acetate at 20° C. for about 2 minutes to elute most of the iodoform from the sensitive member into the ethyl acetate. Then the sensitive member was taken out of the ethyl acetate and then soaked in trichloroethylene at 25° C. until the volume became 130% based on the original volume for about 2 minutes. Almost all of the remaining iodoform was eluted into the trichloroethylene and the sensitive member became colorless. Then the sensitive member was taken out of trichloroethylene and soaked in isopropyl alcohol at 30° C. for about 3 minutes and finally taken out of isopropyl alcohol. The volume of the sensitive member was 105% based on the original volume. Thus a volume phase hologram was produced which has a spatial frequency of about 3600 lines/mm., a diffraction efficiency of 85% and a transmittance of 89% (exposure energy of 150 mJ/cm²). Stability of the hologram was measured in a way similar to Example 1 and found to be as good as that in Example 1.

EXAMPLE 17

2.0 g. of brominated polyvinylcarbazole and 0.3 g. of triiodoethane were dissolved in 25 g. of monochlorobenzene and then treated following the procedure of Example 16. The resulting hologram showed excellent characteristics similar to Example 16.

EXAMPLES 18-21

The sensitive member of Example 17 was exposed to an interference pattern in a way similar to Example 1, soaked in acetone at 20° C. for about one minute, taken out of acetone, and subjected to the first and the second solvent treatments as shown in the table below for two minutes in each treatment. The volume of the sensitive member after each solvent treatment is based on the volume of the sensitive member immediately after exposure. The diffraction efficiency measured as in Example 1 of the resulting hologram is also shown in the table below.

| Example No. | First solvent treatment | Second solvent treatment |
|---|---|---|
| 18 | 30° C., xylene | 30° C., n-pentane |
| 19 | 25° C., cumene | 20° C., n-hexane |
| 20 | 25° C., xylene/carbon tetrachloride (7/3) | 20° C., n-pentane |
| 21 | 30° C. xylene/ethyl acetate (5/2) | 25° C., n-heptane |

| Example No. | Volume after the first solvent treatment (%) | Volume after the second solvent treatment (%) | Diffraction efficiency (%) |
|---|---|---|---|
| 18 | 150 | 105 | 96 |
| 19 | 135 | 100 | 81 |
| 20 | 145 | 105 | 85 |
| 21 | 165 | 110 | 98 |

EXAMPLES 22-25

The hologram plates obtained in Examples 18-21 was allowed to stand at 70° C. and 100% RH for the purpose of investigating the humidity and heat resistance, there was found no change in the hologramic characteristics even after one month.

Further, light resistance was investigated by irradiating the hologram plates at a distance of 20 cm. with a 500 W mercury lamp for 5 hours and it was found that the hologram plates remained colorless and the hologramic characteristics were not changed at all.

EXAMPLES 26-28

3.0 g. of polyvinylcarbazole and 0.1 g. of iodoform were dissolved in 30 g. of tetrahydrofuran and treated in a way similar to Example 1 to produce three hologramic recording sensitive members 3.0, 5.0 and 9.0 microns thick, respectively.

These three sensitive members were exposed to an interference pattern in a way similar to Example 1, soaked in benzyl alcohol at 15° C. for about 2 minutes, and taken out of benzyl alcohol. It was found that almost all of the iodoform was eluted and the sensitive member became colorless.

Then the sensitive members were soaked in xylene at 30° C. and allowed to stand until the volume of the sensitive member became the value as shown in the table below. The sensitive members were taken out of xylene, soaked in n-hexane at 20° C. and allowed to stand until the volume became the value as shown in the table below.

Then the sensitive members were taken out of n-hexane to complete the holograms. Diffraction efficiency and transmittance of the holograms are shown in the table below.

| Example No. | Thickness sensitive member (microns) | Volume after soaked in xylene (%) | Volume after soaked in n-hexane (%) | Diffraction efficiency (%) | Transmittance (%) |
| --- | --- | --- | --- | --- | --- |
| 26 | 3.0 | 135 | 100 | 52 | 86 |
| 27 | 5.0 | 160 | 105 | 89 | 90 |
| 28 | 9.0 | 150 | 105 | 92 | 82 |

(The volume is based on the volume of the sensitive member immediately after exposure, and the diffraction efficiency and transmittance are measure in a way similar to Example 1.)

Humidity resistance and heat resistance of these holograms were measured in a way similar to Example 15 and found to be as good as those in Example 15.

Light resistance of each of these holograms was as good as that of the hologram in Example 15 and further, change in hologramic characteristics of these holograms was hardly obserbed during storage.

What we claim is:

1. A process for producing holograms which comprises
   (i) exposing to an interference pattern of laser a film-like sensitive member for recording holograms which is mainly composed of a polymer selected from the group consisting of polyvinylcarbazole, alkyl-substituted derivatives thereof and halogen-substituted derivatives thereof and is sensitized to a radiation by using an iodine compound,
   (ii) swelling the sensitive member in a first solvent until a volume of the sensitive member becomes 120% or more based on the volume immediately after the exposure and simultaneously eluting most of the iodine compound, and
   (iii) transferring the sensitive member into a second solvent to treat the sensitive member until the volume of the sensitive member becomes 110% or less based on the volume immediately after the exposure.

2. A process according to claim 1 in which the iodine compound is used in an amount of 0.1–200% by weight based on the polymer.

3. A process according to claim 1 in which the iodine compound is a member selected from the group consisting of carbon tetraiodide, iodoform, ethylene tetraiodide, ethane triiodide, ethane tetraiodide, ethane pentaiodide, and ethane hexaiodide.

4. A process according to claim 1 in which the first solvent and the second solvent hardly elute the polymer.

5. A process according to claim 1 in which the laser has an emission line in the visible wavelength region.

6. A process according to claim 1 in which the first solvent is a member selected from the group consisting of benzene, toluene, xylene, ethylbenzene, propylbenzene, cumene, phenol, cresol, chlorobenzene, dichlorobenzene, nitrobenzene, benzyl alcohol, benzyl chloride, benzyl bromide, α-methylnaphthalene, α-chloronaphthalene, dichloromethane, chloroform, trichloroethylene, dichloroethane, bromoform, trichloroethane, tetrachloroethane, acetone, methyl ethyl ketone, cyclohexanone, dioxane, tetrahydrofuran, ethyl acetate, and ethyl formate.

7. A process according to claim 1 in which the second solvent is a member selected from the group consisting of pentane, hexane, heptane, octane, isooctane, cyclohexane, methyl alcohol, ethyl alcohol, n-propyl alcohol, isopropyl alcohol, butyl alcohol, amyl alcohol, diethyl ether, methyl ethyl ether, and diisopropyl ether.

8. A process according to claim 1 in which the polymer is a member selected from the group consisting of polyvinylcarbazole, poly-3-chlorovinylcarbazole, poly-3-bromovinylcarbazole, poly-3-iodovinylcarbazole, poly-3-methylvinylcarbazole, poly-3-ethylvinylcarbazole, chlorinated polyvinlycarbazole, and brominated polyvinylcarbazole.

9. A process for producing holograms which comprises
   (i) exposing to an interference pattern of laser a film-like sensitive member for recording holograms which is mainly composed of a polymer selected from the group consisting of polyvinylcarbazole, alkyl-substituted derivatives thereof and halogen-substituted derivatives thereof and is sensitized to a radiation by using an iodine compound,
   (ii) soaking the sensitive member in a first solvent to elute and remove most of the iodine compound without eluting the polymer,
   (iii) then swelling the sensitive member in a second solvent until a volume of the sensitive member becomes 120% or more based on the volume immediately after the exposure, and
   (iv) transferring the sensitive member into a third solvent to treat the sensitive member until the volume of the sensitive member becomes 100% or less based on the volume immediately after the exposure.

10. A process according to claim 9 in which the iodine compound is used in an amount of 0.1–200% by weight based on the polymer.

11. A process according to claim 9 which the iodine compound is a member selected from the group consisting of carbon tetraiodide, iodoform, ethylene tetraiodide, ethane triiodide, ethane tetraiodide, ethane pentaiodide, and ethane hexaiodide.

12. A process according to claim 9 in which the second solvent and the third solvent hardly elute the polymer.

13. A process according to claim 9 in which the laser has an emission line in the visible wavelength region.

14. A process according to claim 9 in which the second solvent is a member selected from the group consisting of benzene, toluene, xylene, ethylbenzene, propylbenzene, cumene, phenol, cresol, chlorobenzene, dichlorobenzene, nitrobenzene, benzyl alcohol, benzyl chloride, benzyl bromide, α-methylnaphthalene, α-chloronaphthalene, dichloromethane, chloroform, trichloroethylene, dichloroethane, bromoform, trichloroethane, tetrachloroethane, acetone, methyl ethyl ketone, cyclohexanone, dioxane, tetrahydrofuran, ethyl acetate, and ethyl formate.

15. A process according to claim 9 in which the third solvent is a member selected from the group consisting of pentane, hexane, heptane, octane, isooctane, cyclohexane, methyl alcohol, ethyl alcohol, n-propyl alcohol, isopropyl alcohol, butyl alcohol, amyl alcohol, diethyl ether, methyl ethyl ether, and diisopropyl ether.

16. A process according to claim 9 in which the polymer is a member selected from the group consisting of polyvinylcarbazole, poly-3-chlorovinylcarbazole, poly-3-bromovinylcarbazole, poly-3-iodovinylcarbazole, poly-3-methylvinylcarbazole, poly-3-ethylvinylcarbazole, chlorinated polyvinylcarbazole, and brominated polyvinylcarbazole.

17. A hologram produced by
  (i) exposing to an interference pattern of laser a film-like sensitive member for recording holograms which is mainly composed of a polymer selected from the group consisting of polyvinylcarbazole, alkyl-substituted derivatives thereof and halogen-substituted derivatives thereof and is sensitized to a radiation by using an iodine compound,
  (ii) swelling the sensitive member in a first solvent until a volume of the sensitive member becomes 120% or more based on the volume immediately after the exposure and simultaneously eluting most of the iodine compound, and
  (iii) transferring the sensitive member into a second solvent to treat the sensitive member until the volume of the sensitive member becomes 110% or less based on the volume immediately after the exposure.

18. A hologram according to claim 17 in which the hologram is a volume phase hologram.

19. A hologram produced by
  (i) exposing to an interference pattern of laser a film-like sensitive member for recording holograms which is mainly composed of a polymer selected from the group consisting of polyvinylcarbazole, alkyl-substituted derivatives thereof and halogen-substituted derivatives thereof and is sensitized to a radiation by using an iodine compound,
  (ii) soaking the sensitive member in a first solvent to elute and remove most of the iodine compound without eluting the polymer,
  (iii) then swelling the sensitive member in a second solvent until a volume of the sensitive member becomes 120% or more based on the volume immediately after the exposure, and
  (iv) transferring the sensitive member into a third solvent to treat the sensitive member until the volume of the sensitive member becomes 110% or less based on the volume immediately after the exposure.

20. A hologram according to claim 19 in which the hologram is a volume phase hologram.